United States Patent

[11] 3,588,674

| [72] | Inventor | Clarence E. Rasmussen<br>Janesville, Wis. |
|---|---|---|
| [21] | Appl. No. | 759,312 |
| [22] | Filed | Sept. 12, 1968 |
| [45] | Patented | June 28, 1971 |
| [73] | Assignee | Electronic Control Corporation<br>Euless, Tex. |

[54] AN ELECTROMECHANICAL PNEUMATIC POWER CONTROLLER FOR ENVIRONMENTAL CONDITIONING SYSTEMS
7 Claims, 9 Drawing Figs.

| [52] | U.S. Cl. | 323/19,<br>219/491, 219/496, 219/504, 323/24, 323/36,<br>323/95, 338/42 |
|---|---|---|
| [51] | Int. Cl. | G05f 3/04 |
| [50] | Field of Search | 219/491,<br>496, 494, 504; 318/335, 481; 323/19, 22 (SCR),<br>24, 36, 95; 338/42 |

[56] References Cited
UNITED STATES PATENTS

| 3,048,770 | 8/1962 | Nye et al. | 323/95X |
| 3,373,343 | 3/1968 | Bailey | 323/19 |
| 3,385,077 | 5/1968 | Marsteller | 323/24UX |
| 3,447,057 | 5/1969 | Brown et al. | 323/22X(SCR) |
| 3,463,990 | 8/1969 | Ross | 323/24UX |

*Primary Examiner*—J. D. Miller
*Assistant Examiner*—A. D. Pellinen
*Attorney*—Robert C. Peterson ABSTRACT: An electromechanical pneumatic power controller for environmental conditioning systems having a variable resistor responsive to variations in pneumatic pressure signals created by an environmental condition sensor, such as a temperature transducer for generating such pneumatic signals, indicative of the environmental conditions, such as temperature, to increase or decrease the resistance in the timing circuit of a solid state power control circuit. The power controller features electromechanical integration with advanced electronic circuits in a compact unit.

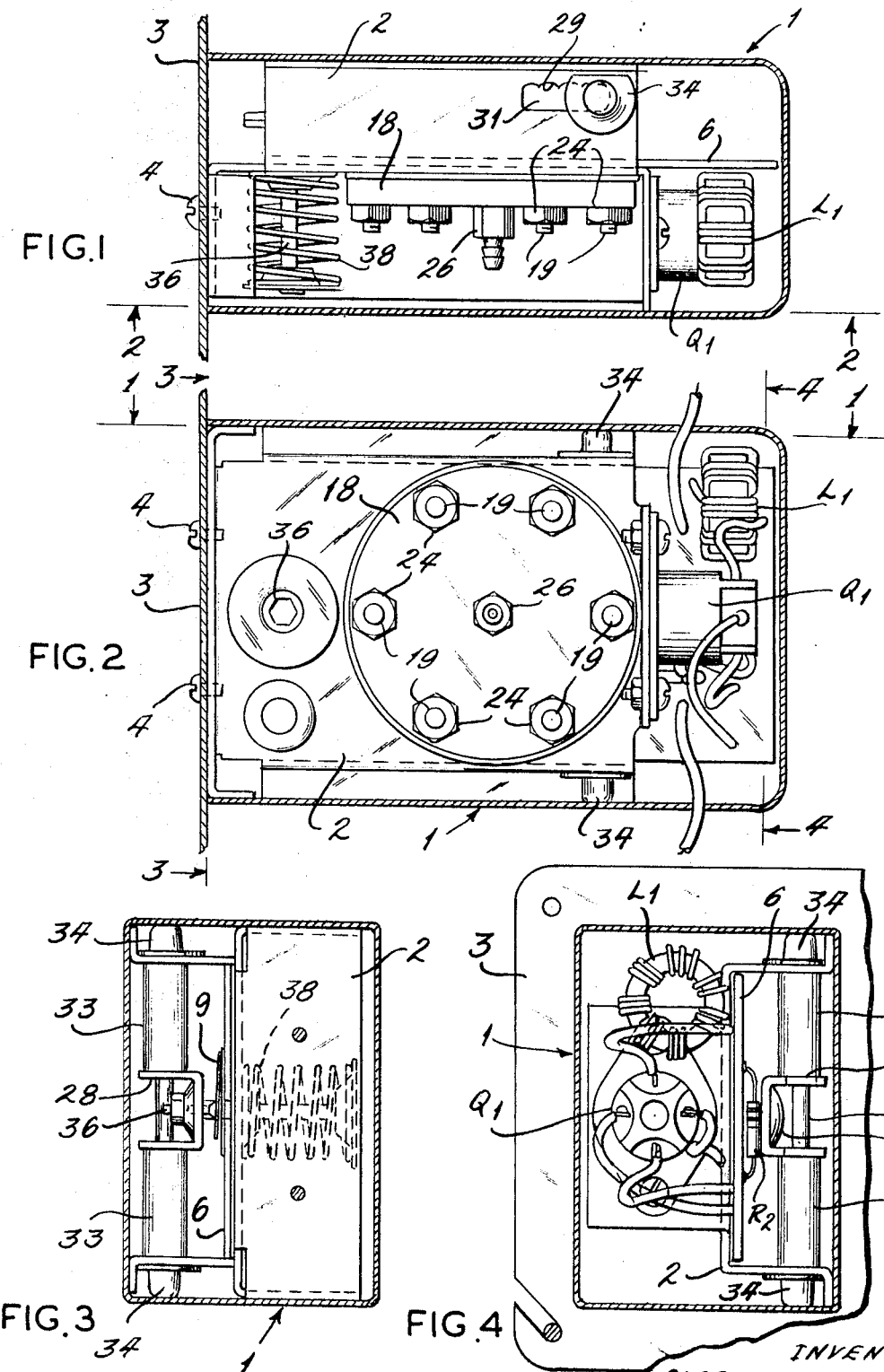

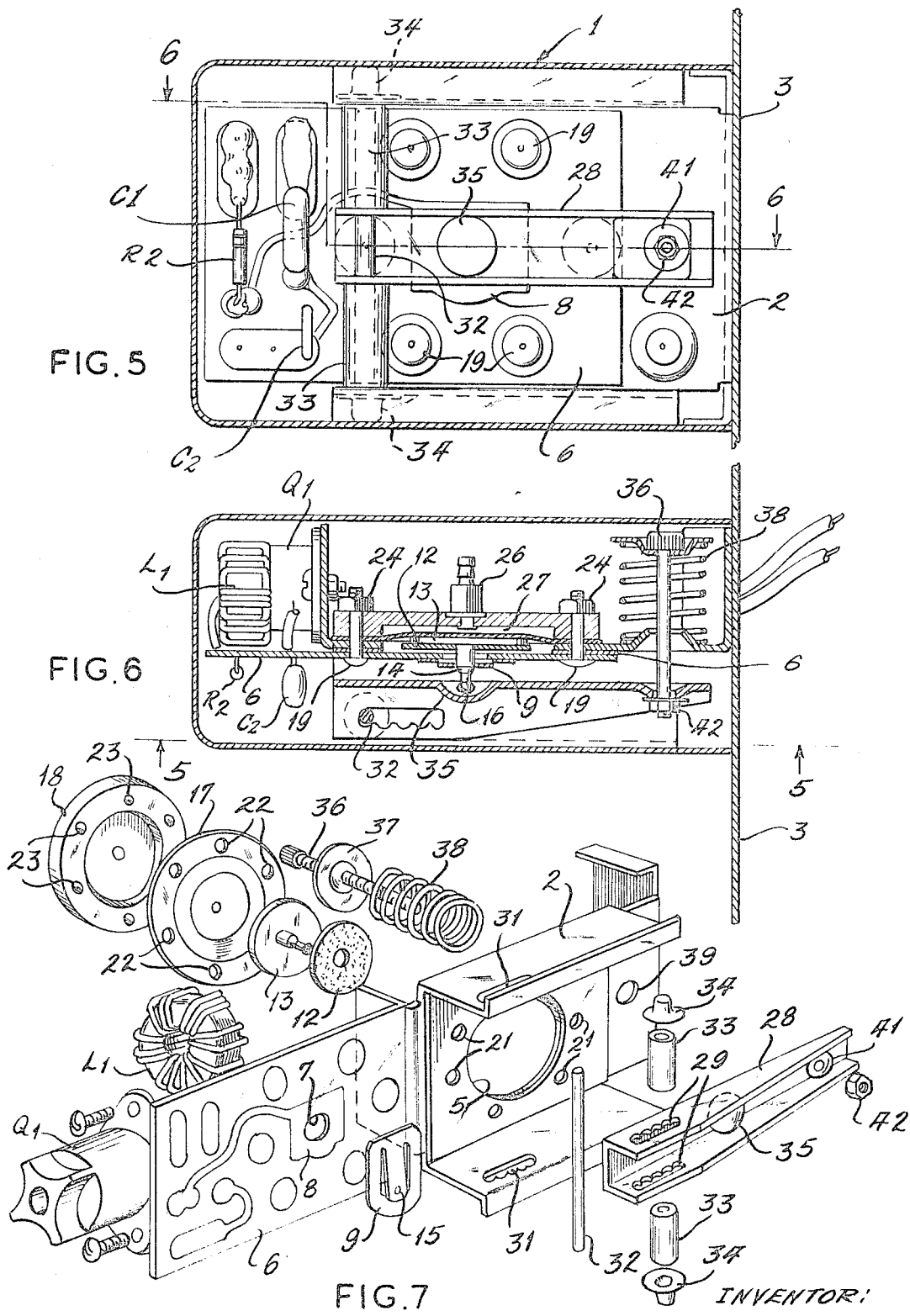

INVENTOR:
CLARENCE E. RASMUSSEN
BY Robert C Petterson
ATTORNEY.

AN ELECTROMECHANICAL PNEUMATIC POWER CONTROLLER FOR ENVIRONMENTAL CONDITIONING SYSTEMS

BACKGROUND OF THE INVENTION

1. Field of Invention

The invention relates to pneumatic power controllers and more particularly to pneumatic power controllers for heating and cooling systems, and still more specifically to dynamic pneumatic power controllers wherein a variable resistance element integrated with a printed circuit board reacts to pneumatic pressure variation whereby the firing time or conduction angle of a solid state electronic power control device or switch increases or decreases electrical power to the heating or cooling system as demanded.

2. Description of Prior Art

The prior art in the power control field discloses various power control circuits wherein the charging time of a timing capacitor determines the conduction angle of a power control device providing power to a load such as a motor. Likewise, various pneumatic controls are known for heating and cooling systems. These controls operate as transducers to convert environmental information into pneumatic signals. Both power control circuits and pneumatic controls are utilized in the invention of Applicant.

The general systems to dynamically control heating and cooling systems were cumbersome, whereas Applicant has devised a compact unitized dynamic pneumatic power control device for heating and cooling system controls.

SUMMARY

Applicant's invention provides a simple and compact unitized dynamic pneumatic power control system having a pneumatic pressure responsive resistance element integrated with an electronic power control device as a part of the timing circuit printed (etched) on a printed circuit board. An environmental condition responsive transducer generates pneumatic signals whenever the environmental conditioning system requires a decrease or increase in electrical power for heating coils or a fan. This pneumatic signal is transduced by the variable resistance element of the timing circuit thus increasing or decreasing the conduction or firing angle of the solid state power control device thereby increasing or decreasing the electrical power to the conditioning system.

It is therefore an object of the invention to provide a dynamic pneumatic power control unit that is compact and has a control transducer integrated with the electronic circuit thereof.

It is another object of the invention to provide a dynamic pneumatic power control unit for controlling environmental conditioning systems wherein load power for the system varies responsive to a pneumatic transducer integrated with an electronic power control circuit.

It is another object of the invention to provide a pneumatically actuated pressure transducer integrated with a printed circuit board as part of the timing circuit in a solid state power control circuit.

It is still another object of the invention to provide a dynamic pneumatic power control unit for controlling heating and cooling systems wherein the unit is electrically connected in series with an AC power line supplying load power to the system and pneumatically connected with a condition sensor whereby pneumatic signals from the condition sensor are translated into resistance variations in the timing circuit of a solid state power control device to control the load power to the systems.

It is still another object of the invention to provide a pneumatic pressure actuated variable resistance device comprising an electrically conductive surface of a printed circuit board, a compressible variable resistance element and a plunger on one side of said board connected by said plunger to the opposite side of said printed circuit board whereby said opposite sides of said printed circuit board are electrically interconnected by the variable resistance element.

These and other objects and advantages of the invention will be apparent from the ensuing description of the drawings and preferred embodiment of the invention.

DRAWING DESCRIPTION

FIG. 1 is a side view to the pneumatic controller assembly taken along the section line 1-1 of FIG. 2.

FIG. 2 is a bottom view of the assembly taken along the section line 2-2 of FIG. 1.

FIG. 3 is an end view of the pneumatic controller taken along the section line 3-3 of FIG. 2

FIG. 4 is another end view of the pneumatic controller unit taken along line 4-4 of FIG. 2.

FIG. 5 is the top view of the pneumatic controller unit taken along section line 5-5 of FIG. 6.

FIG. 6 is the rear view of the pneumatic controller unit taken along section line 6-6 of FIG. 5.

FIG. 7 is an exploded perspective view of the pneumatic controller unit.

PREFERRED EMBODIMENT

Figure 8:
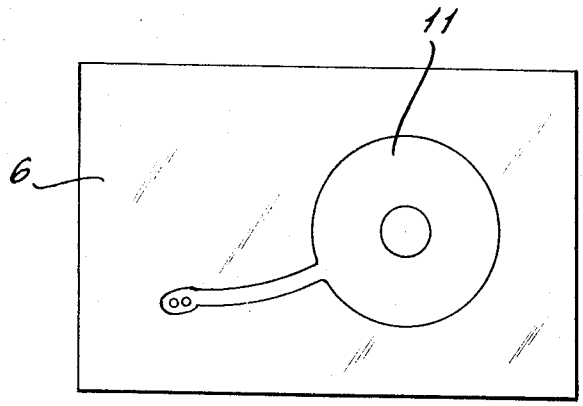
FIG. 8 is a view of the diaphragm side of the printed circuit board.

Referring now to the drawings and particularly FIG. 1 through FIG. 7, the assembly will be described. The construction of the dynamic pneumatic power control unit, generally designated by the integer 1, is portrayed by FIGS. 1—6, whereas the components are well illustrated in FIG. 7, the exploded view of control unit 1.

Figure 9:
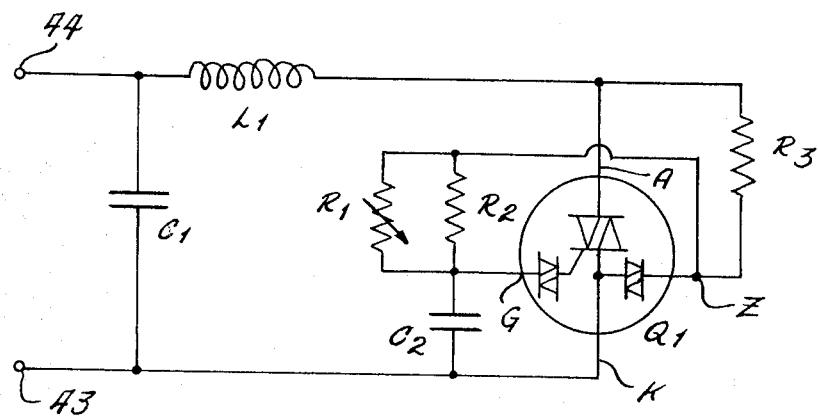
FIG. 9 is a schematic diagram of the electrical circuit of the pneumatic controller unit.

Control unit 1 includes a chassis 2 attached to mounting plate 3 by a pair of bolt and nut sets 4. The chassis 2 has a central cutout 5. Secured to the chassis 2 is printed circuit board 6 whereupon circuit components of the electronic solid state power control device, illustrated in FIG. 9, are mounted. As noted in FIG. 7, the circuit board 6 has a central aperture 7 with a generally square copper pad 8 upon which commutator spring 9 is soldered. In FIG. 8, the side opposite commutator spring 9 around aperture 7 has a circular copper pad 11 centered over cutout 5 of chassis 2 and electrically isolated therefrom. Against the circular copper pad 11, a variable resistance material 12 is held by piston 13. The resistance material 12 is a graphite or carbon impregnated fiber or foam material which varies relatively uniformly under compression and varies in effective resistance likewise. The piston 13 has a hollow stem 14 which passes through aperture 7 and seats in spring aperture 15 making electrical contact thereagainst. In hollow stem 14, an insulator insert 16 is provided. A diaphragm 17 is held against piston 13 by a cap clamp 18 secured to chassis 2 by bolts 19 attached to circuit board 6 passing through chassis apertures 21, diaphragm apertures 22 and clamp apertures 23, and secured by nuts 24. The center of cap clamp 18 has a pneumatic inlet 26 for passage of air or pneumatic fluid into the pressure chamber 27 defined by diaphragm 17 and cap clamp 18.

In order to prevent excessive pressure on commutator spring 9 and more readily control the pressure required to vary the resistance of resistance material 12, a control lever 28 having rack slots 29 at one end is provided. Also, chassis 2 has similar complimentary rack slots 31. A fulcrum rod 32 seats in the rack slots 29 and 31, and spacers 33 maintain lever 28 centered. End caps 34 secure fulcrum rod 32 in place. Control lever 28 has a center dimple 35 that forms a seat for insulator insert 16. The tensioning of control lever 28 against insulator insert 16 is achieved by tensioning bolt 36 seated on dimpled washer 37 which seats against coil spring 38. Bolt 36 passes through aperture 39 in chassis 2 and aperture 41 in control lever 28 and secured by nut 42. Tensioning may be adjusted by tightening or loosening tensioning bolt 36 or moving fulcrum rod 32 to various positions in the rack slots 29 and 31.

From the foregoing description it should be apparent that pneumatic pressure in chamber 27 forces piston 13 against resistance material 12 compressing same and varying the resistance thereof. The resistance is positioned between circular copper pad 11 and piston 13 and the electrical path from pad 11 through piston 13, piston stem 14, commutator spring 9 to square copper pad 8. Thus, as later described, the electrical path between the square pad 8 and circular pad 11 provides the variable resistance in the timing circuit of the solid state power control device of FIG. 9.

Referring to FIG. 9, a typical circuit for the pneumatic power controller is illustrated. Contacts 44 and 43 are connected in series with one side of an AC power line coupled to a heat modulation control having a pneumatic signal output responsive to varying heat conditions. A filter capacitor $C_1$ is connected across contacts 44 and 43 and a choke coil $L_1$ is connected between contact 44 and Anode A of bilateral switch $Q_1$. The cathode K of switch $Q_1$ is connected to contact 43. Resistor $R_3$ is connected between anode A and compensator lead Z. Variable resistor $R_1$ and matching resistor $R_2$ connected together in parallel are connected between compensator lead Z and gate G of switch $Q_1$. Capacitor $C_2$ couples gate G to cathode K of power switch $Q_1$. In operation of the circuit as pneumatic pressure increases or decreases in pressure chamber 27, the resistance of variable resistor $R_1$, the resistance material 12, increases or decreases thus varying the charging time of capacitor $C_2$ and hence the firing angle (conduction angle) of bilateral power switch $Q_1$.

Power switch $Q_1$ is a compensated solid state bilateral power control switch available from Electronic Control Corporation Euless, Texas 76039, as Quadrac * device, part no. 0-0068-03. *trademark of Electronic Control From the foregoing it will be readily apparent that various modifications and changes to the invention disclosed herein will be obvious to those skilled in the art relative hereto, and all such changes and modifications are deemed to be within the scope and purview of the invention disclosed herein except as necessarily limited by the scope of the appended claims.

I claim:

1. In an environmental conditioning system having a condition sensor for generating pneumatic signals indicative of environmental conditions, a pneumatically reactive electromechanical load power controller for such system comprising:
   a. a printed circuit board defining power control circuitry including a pair of copper contacts on opposite sides of said circuit board for coupling a variable resistance element therebetween;
   b. a variable resistance element seated on one side of said circuit board in direct electrical contact with one of said pair of copper contacts;
   c. a plunger seated in direct electrical contact against the other side of said variable resistance element and making electrical contact with the other of said pair of copper contacts;
   d. a pneumatic means for applying a force against said plunger to vary the force applied to said variable resistance element responsive to the pneumatic signals to vary the resistance thereof; and
   e. a solid state power control circuit including said printed circuit board responsive to changes in resistance of said variable resistance element to vary the conduction angle of said power control circuit thereby varying the load power of said conditioning system.

2. The controller of claim 1 wherein said pair of copper contacts encircle an aperture through said printed circuit board, said variable resistance element has a central aperture therethrough, said plunger has a stem extending through said aperture in said printed circuit board and said central aperture, and biasing means electrically connecting said stem of said plunger to the other of said pair of copper contacts.

3. In an environmental conditioning system having a condition sensor for generating pneumatic signals indicative of environmental conditions, a pneumatically reactive electromechanical load power controller comprising:
   a. a printed circuit board defining power control circuitry including a pair of copper contacts on opposite sides of said circuit board for coupling a variable resistance element therebetween;
   b. a variable resistance element seated on one side of said circuit board in direct electrical contact with one of said pair of copper contacts;
   c. a plunger seated in direct electrical contact against the other side of said variable resistance element and making electrical contact with the other of said pair of copper contacts;
   d. a diaphragm seated in direct contact with said plunger;
   e. a housing including said diaphragm as a portion thereof for translating the pneumatic signals into movement of said diaphragm and plunger to cause compression or allow expansion of said variable resistance element to vary the resistance thereof; and
   f. a solid state power control circuit including said printed circuit board responsive to changes in resistance of said variable resistance element to vary the conduction angle of said power control circuit thereby varying the load power of said conditioning system.

4. The controller of claim 3 wherein said pair of copper contacts encircle an aperture through said printed circuit board, said variable resistance element has a central aperture therethrough, said plunger has a stem extending through said aperture in said printed circuit board and said central aperture, and biasing means electrically connecting said stem of said plunger to the other of said pair of copper contacts.

5. The controller of claim 4 wherein said biasing means opposes movement of said plunger.

6. The controller of claim 5 wherein said biasing means includes a spring biased lever having a tensioning adjustment to vary the sensitivity of the load power controller.

7. The controller of claim 6 wherein said biasing means further includes a fulcrum length adjustment for said spring biased lever to further adjust the sensitivity of the load power controller.